Nov. 16, 1948.  H. L. REILLY ET AL  2,454,007
NAVIGATIONAL INSTRUMENT
Filed May 24, 1945
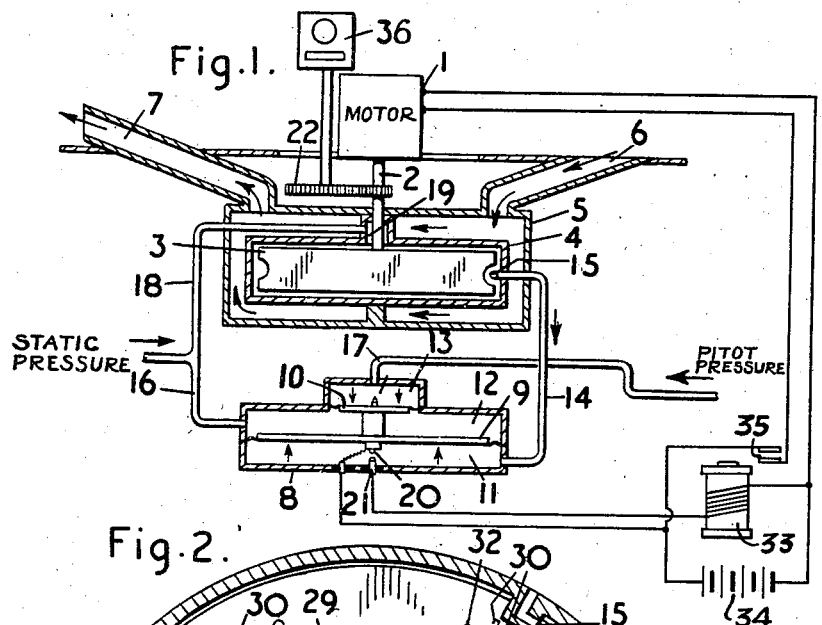
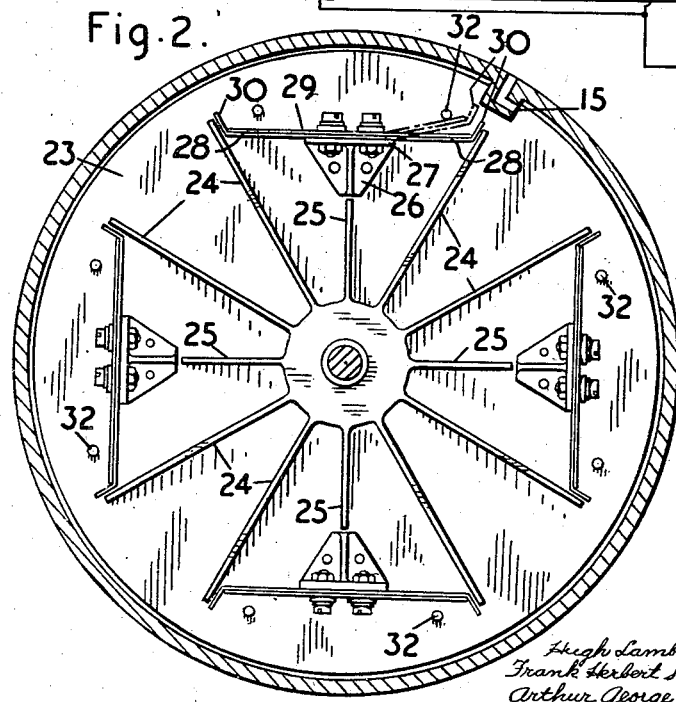
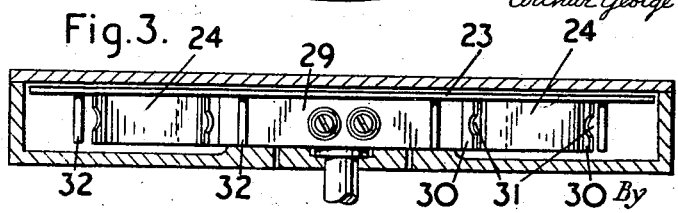
Inventors
Hugh Lambert Reilly
Frank Herbert Scrimshaw
Arthur George Bone
By
Loyd Hall Sutton
Attorney Patented Nov. 16, 1948

2,454,007

UNITED STATES PATENT OFFICE 2,454,007

NAVIGATIONAL INSTRUMENT

Hugh Lambert Reilly, Frank Herbert Scrimshaw, and Arthur George Bone, Farnborough, England, assignors to Henry Hughes and Son Limited, Barkingside, England Application May 24, 1945, Serial No. 595,634
In Great Britain May 26, 1944

7 Claims. (Cl. 73—183)

This invention relates to an instrument for determining movement of an aircraft or other navigable craft (hereinafter referred to as "aircraft") relative to the surrounding air. The instrument may be used to determine movement relative to time to give air speed or it may determine movement irrespective of time to give distance travelled relative to the air. The relative movement can be registered by an indicating or recording mechanism.

The invention refers to instruments of the type in which the pressure generated by a rotary fan (herein termed "fan pressure") is caused to act on a pressure responsive system in opposition to the pressure produced for example by a pitot head by relative movement of the aircraft and the surrounding air (herein termed "pitot pressure"), and the pressure responsive system controls a motor driving said fan in such a manner that the fan is driven at a speed which will tend to maintain said pressure responsive system balanced, and means is provided for indicating or recording either the mean rotational speed of the fan or the total number of revolutions of the fan from a selected datum instant or both.

Such instruments depend upon the fact that the pressure developed by a rotating fan is very nearly proportional to the square of the velocity of the tips of the fan blade and the air density and may be represented by:

$$P_f = KDV_f^2$$

Since the velocity at the tips of the fan blade will be proportional to the effective radius of the fan and the fan speed, the pressure may be expressed as:

$$P_f = KDR^2N^2$$

The pressure developed in the pitot head due to its movement through air may be represented by:

$$P_p = \tfrac{1}{2}DV_t^2\left(1 + \tfrac{1}{4}\frac{V_t^2}{C^2}\right)$$

In these expressions $P_f$ represents fan pressure, $P_p$ pitot pressure, $K$ a constant, $D$ density of the air, $R$ the effective radius of the fan, $N$ the rotational speed of the fan, $V_f$ velocity of fan blade tips, $V_t$ the true airspeed of the aircraft; and $C$ is the velocity of sound.

If the expression $$\left(\tfrac{1}{4}\frac{V_t^2}{C^2}\right)$$

representing the compressibility effect is ignored then the fan pressure $P_f$ is applied to a pressure responsive element having an effective area $A_2$ and the movement of this element is opposed by applying the pitot pressure $P_p$ to the same or another element having an effective area $A_1$, then since D is common, $$A_1V_f^2 = A_1\tfrac{1}{2}V_t^2$$

For a fan of a given size $V_f^2$ will be proportional to fan speed, and it follows therefore that with such an instrument the fan speed will be directly proportional to the true airspeed.

An investigation has shown that the accuracy of such instruments is affected by height and speed because of the compressibility effect which causes the pitot pressure to increase more rapidly than proportional to the square on true airspeed. Although there is a corresponding compressibility effect on the fan pressure, it does not compensate for the effect on the pitot pressure because the absolute velocity of the fan blade tips is low compared with the true airspeed.

The object of this invention is to improve such instruments by compensating for the extra increase in pitot pressure due to compressibility effect.

According to this invention an instrument of the type specified incorporates a fan the effective radius of which increases with its rotational speed.

The invention may be carried into effect by providing a movable tip for the fan blades, or certain of them, said tip being biassed towards the fan axis against the action of centrifugal force.

Preferably, with a fan having radial blades, a strip of resilient material is fixed to the fan so that a part of the strip projects unsupported towards the blade, the unsupported part having an upturned end extending parallel with the blade, said strip being so arranged that when the fan is rotating the upturned end will move outwards with increase in rotational speed of the fan.

The invention will be more clearly understood by the following description of an instrument according to this invention in which:

Figure 1 illustrates diagrammatically the instrument.

Figure 2 is an enlarged sectional plan view of the fan chamber.

Figure 3 is a sectional elevation of the fan chamber on the same scale as Figure 2.

In Figure 1 of the drawing, the motor 1 drives a fan shaft 2 carrying a fan 3. The fan is arranged in an airtight chamber 4 surrounded by a cooling jacket 5 into which air or other fluid for maintaining the fan temperature at the temperature of the surrounding air enters by the inlet 6 and leaves by the outlet 7.

Beneath the fan chamber is arranged a diaphragm casing 8 divided by the diaphragms 9 and 10 into three chambers 11, 12 and 13. The chamber 11 is communicated by the pipe 14 to a scoop 15 facing the blades of the fan to apply fan pressure to the underside of the diaphragm 9. The chamber 12 is connected by a pipe 16 to a source of airplane static pressure, while the chamber 13 is connected by the pipe 17 to a source of pitot pressure, such as a pitot head (not shown). The pipe 16 has a branch 18 which supplies airplane static pressure to the hub 19 of the fan.

The diaphragms 9 and 10 are connected together to form a pressure responsive system and carry a contact 20 cooperating with a fixed contact 21 on the casing 8, said contacts being connected in series with a relay 33 across a source of electricity, such as a battery 34, which is also connected to the motor 1 by contacts 35 actuated by the relay 33. The arrangement is such that when the relay circuit is closed by the contacts 20 and 21, the relay contacts 35 close and the motor 1 is accelerated, and that when said contacts 20 and 21 open, the relay contacts 35 open and the motor 1 is decelerated.

When the force due to pitot pressure acting on the smaller diaphragm 10 exceeds the force due to fan pressure acting on the larger diaphragm 9, the circuit to the motor will be closed and the motor will drive the fan at a gradually increasing speed until the pressure responsive system is balanced when the circuit will be opened. Thus the motor will hunt about a speed at which the pressure responsive system is balanced. The speed of rotation of the fan shaft will thus be proportional to the true airspeed and the number of revolutions of the fan shaft will also be proportional to the distance travelled, and these can be indicated or recorded by connecting an indicator 36 of known form to the fan shaft 2 by the gearing 22.

As shown in Figures 2 and 3 the fan consists of a circular plate 23 carrying eight radially arranged blades 24 and four blades 25 of shorter length than the other blades. At the end of each of the blades 25 is a bracket 26 secured to the circular plate 23, the bracket providing a flat surface 27 at right angles to the blade 25. A flat plate 28 of flexible metal is fixed to the flat surface 27 to bridge the gap between the tips of the blades 24 at either side of the blade 25. Each end of this plate 28 is bent at an angle of approximately 120° so that this bent end lies adjacent and approximately parallel to the tip of its associated blade 24, preferably projecting just beyond the fixed blade. A leaf spring 29 overlies the plate 28 except at its upturned ends, this spring being also fixed to the bracket 26.

The bent ends 30 of the plate 28 function as movable tips of the adjacent fan blades 24, which when the fan is rotating will move outwards and inwards due to changes in centrifugal force acting on the unsupported parts, the amount of movement for a given change in the rotational speed depending on the mass of the movable tips and the stiffness of the plate spring assembly.

The bent ends 30 are cut away at 31 to miss the fan scoop 15 in their extreme outwards position as shown in dotted lines in Figure 2, and stops 32 are provided to prevent these ends fouling the scoop in the event of the speed exceeding a predetermined amount.

The relation between deflection of the spring plate assembly and the rotational speed of the fan may be represented by the formula: $ARN^2$ where A represents the stiffness of the spring-plate assembly and R and N have the significance hereinbefore referred to. Consequently the pressure developed by a fan so constructed may be represented by:

$$BD(R+ARN^2)^2N^2$$

or approximately $$BDR^2(1+2AN^2)N^2$$

when B is a constant.

Thus N may be made proportional to $V_t$ by a suitable choice of the length and stiffness of the springs 29 and plates 28.

We claim:

1. An instrument for determining movement of an aircraft relative to the surrounding air comprising a rotary fan, means on said fan for increasing its effective radius with rotational speed, a fan chamber having an air inlet near the hub of the fan, a pressure responsive system, means for communicating the pressure at the periphery of said fan to one side of the said system, means for communicating pitot pressure to the opposite side of said system, a motor for driving said fan, means comprising contacts actuated by said system for controlling the speed of the motor and a device driven by said fan for registering movement of the aircraft relative to the surrounding air.

2. An instrument for determining relative movement between an aircraft and the surrounding air comprising a chamber having an inlet at its centre and an outlet at its periphery, a rotary fan in said chamber, said fan having fan blades, a movable tip on at least one of said blades arranged to increase the effective radius of the fan with increase in rotational speed, a pressure responsive system, means for communicating the pressure at the periphery of said fan to one side of the said system, means for communicating pitot pressure to the opposite side of said system, a motor for driving said fan, means comprising contacts actuated by said system for controlling the speed of the motor and a device driven by said fan for registering movement of the aircraft relative to the surrounding air.

3. An instrument as claimed in claim 2 in which the movable tip is biassed towards the fan axis against the action of centrifugal force.

4. An instrument for determining relative movement between an aircraft and the surrounding air comprising, a chamber, a rotary bladed fan in said chamber, a resilient member fixed to the fan having an unsupported part projecting towards a blade and terminating approximately at the end of the blade, said unsupported part being arranged to move outwards with increase in rotational speed of the fan, a pressure responsive system, means for communicating the pressure at the periphery of said fan to one side of the said system, means for communicating pitot pressure to the opposite side of said system, a motor for driving said fan, means comprising contacts actuated by said system for controlling the speed of the motor and a device driven by said fan for registering movement of the aircraft relative to the surrounding air.

5. An instrument as claimed in claim 4, in which the resilient member has a bent end which extends parallel to the blade and terminates approximately at the end of the blade.

6. An instrument for determining relative movement between an aircraft and the surrounding air comprising a chamber, a fan having radial blades in said chamber, some of the radial blades being shorter than the others, each shorter blade being positioned between two longer blades, a resilient member fixed at the end of each shorter blade in a position approximately at right angles to said shorter blade and extending unsupported towards the longer blades, each of said resilient members having end parts lying adjacent to and approximately parallel to the trips of the longer blades at each side of the short blade adapted to move outwards with increase in rotational speed of the fan, stops to limit the outward movement of said ends, a pressure responsive system, means for communicating the pressure at the periphery of said fan to one side of the said system, means for communicating pitot pressure to the opposite side of said system, a motor for driving said fan, means comprising contacts actuated by said system for controlling the speed of the motor and a device driven by said fan for registering movement of the aircraft relative to the surrounding air.

7. An instrument for determining movement of aircraft relative to the surrounding air comprising a rotary fan, a cylindrical chamber containing said fan, having an air inlet near the fan axis and an outlet scoop near the fan periphery, a slotted resilient member on said fan arranged to move outwards with increase in rotational speed for increasing the effective radius of the fan, a pressure responsive system, means for communicating the pressure in the scoop to one side of said system, means for communicating pitot pressure to the opposite side of the said system, a motor for driving said fan, means comprising contacts actuated by said system for controlling the speed of the motor and a registering device driven by said fan.

HUGH LAMBERT REILLY.
FRANK HERBERT SCRIMSHAW.
ARTHUR GEORGE BONE.

REFERENCES CITED

The following references are of record in the file of this patent:

UNITED STATES PATENTS

| Number | Name | Date |
|---|---|---|
| 1,451,064 | Dunajeff | Apr. 10, 1923 |
| 2,269,068 | Corbin | Jan. 6, 1942 |
| 2,383,001 | Mader | Aug. 21, 1945 |
| 2,441,381 | Anderson | May 11, 1948 |

FOREIGN PATENTS

| Number | Country | Date |
|---|---|---|
| 571,753 | France | Feb. 8, 1924 |